HEINRICH C. ROTHE,
FRITZ K. MUELLER,
WILHELM E. ROTHE, AND
AARON G. LOUGHEAD,
INVENTORS.

BY
Alvin E. Moore,
ATTORNEY.

HEINRICH C. ROTHE,
FRITZ K. MUELLER,
WILHELM E. ROTHE, AND
AARON G. LOUGHEAD,
*INVENTORS.*

BY Alvin E. Moore,
ATTORNEY.

Nov. 8, 1966

H. C. ROTHE ETAL 3,283,408

MERIDIAN AND LATITUDE INDICATOR

Filed Feb. 13, 1962

HEINRICH C. ROTHE,
FRITZ K. MUELLER,
WILHELM E. ROTHE, AND
AARON G. LOUGHEAD,
INVENTORS.

BY
Alvin E. Moore,
ATTORNEY.

Nov. 8, 1966     H. C. ROTHE ETAL     3,283,408

MERIDIAN AND LATITUDE INDICATOR

Filed Feb. 13, 1962     7 Sheets-Sheet 5

HEINRICH C. ROTHE,
FRITZ K. MUELLER,
WILHELM E. ROTHE, AND
AARON G. LOUGHEAD,
*INVENTORS.*

BY

*ATTORNEY.*

Nov. 8, 1966　　　　H. C. ROTHE ETAL　　　　3,283,408
MERIDIAN AND LATITUDE INDICATOR
Filed Feb. 13, 1962　　　　　　　　　　　7 Sheets-Sheet 6

HEINRICH C. ROTHE,
FRITZ K. MUELLER,
WILHELM E. ROTHE, AND
AARON G. LOUGHEAD,
　　　　*INVENTORS.*

BY
　Alvin E. Moore,
　　　　*ATTORNEY.*

HEINRICH C. ROTHE,
FRITZ K. MUELLER,
WILHELM E. ROTHE, AND
AARON G. LOUGHEAD,
*INVENTORS.*

BY
*Alvin E. Moore,*
ATTORNEY.

United States Patent Office 3,283,408
Patented Nov. 8, 1966

3,283,408
MERIDIAN AND LATITUDE INDICATOR
Heinrich Carl Rothe, Fritz Kurt Mueller, Wilhelm Ernst Rothe, and Aaron George Loughead, all of Huntsville, Ala., assignors to Astro-Space Laboratories, Inc., Huntsville, Ala.
Filed Feb. 13, 1962, Ser. No. 172,949
19 Claims. (Cl. 33—72)

This invention relates to a measuring and indicating instrument that may be used in indicate the meridian of its location, the latitude of its location or the bearing of an object relative to the points of the compass. It may be used ashore to ascertain direction or latitude or in determining or adjusting the lay of a missile, artillery piece, line-throwing gun, or architectural element. It also may be used in navigation on land, sea, or in the air, in ascertaining direction or latitude.

One of the problems in designing a gyroscopic north-seeking instrument exists in the inherent tendency of the known type of gyrocompass to oscillate about its vertical axis as it continually moves to keep its spin axis pointed toward the true north. This oscillation tends to generate friction in the bearings that support the oscillating gyroscope's casing and in the electrical connection means between this casing and relatively stationary outside elements, thus causing an accuracy-disturbing precession, and requiring a long period for obtaining a reading from the instrument. A need exists for a more accurate north-seeking device which will quickly measure and indicate the meridian and the bearing of an object relative to it.

There is also a definite and very important need for an efficient device which will quickly and accurately indicate the latitude of the instrument. For example, in the submarine art this necessity is becoming more urgent as craft that may stay submerged long periods of time—at times under polar ice—are coming into more general use. An efficient automatic latitude indicator would be of considerable value in dead reckoning aboard such a submarine.

In view of these facts one of the objects of this invention is to provide an accurate meridian indicator which will function in a short length of time.

Another object of the invention is to provide an accurate latitude indicator.

A further object is to provide an automatically operating latitude indicator which will quickly and continuously measure and indicate the latitude of its location.

Another object is to provide a measuring device for determining and indicating the azimuth or compass bearing of a datum line or object.

Still another object is to provide, in a unitary device, means for indicating the meridian, latitude and bearing or azimuth of an object.

The foregoing and other objects of the invention will become more fully apparent from the following detailed description of exemplary structure embodying the invention and from the accompanying drawings, in which.

Figure 1:
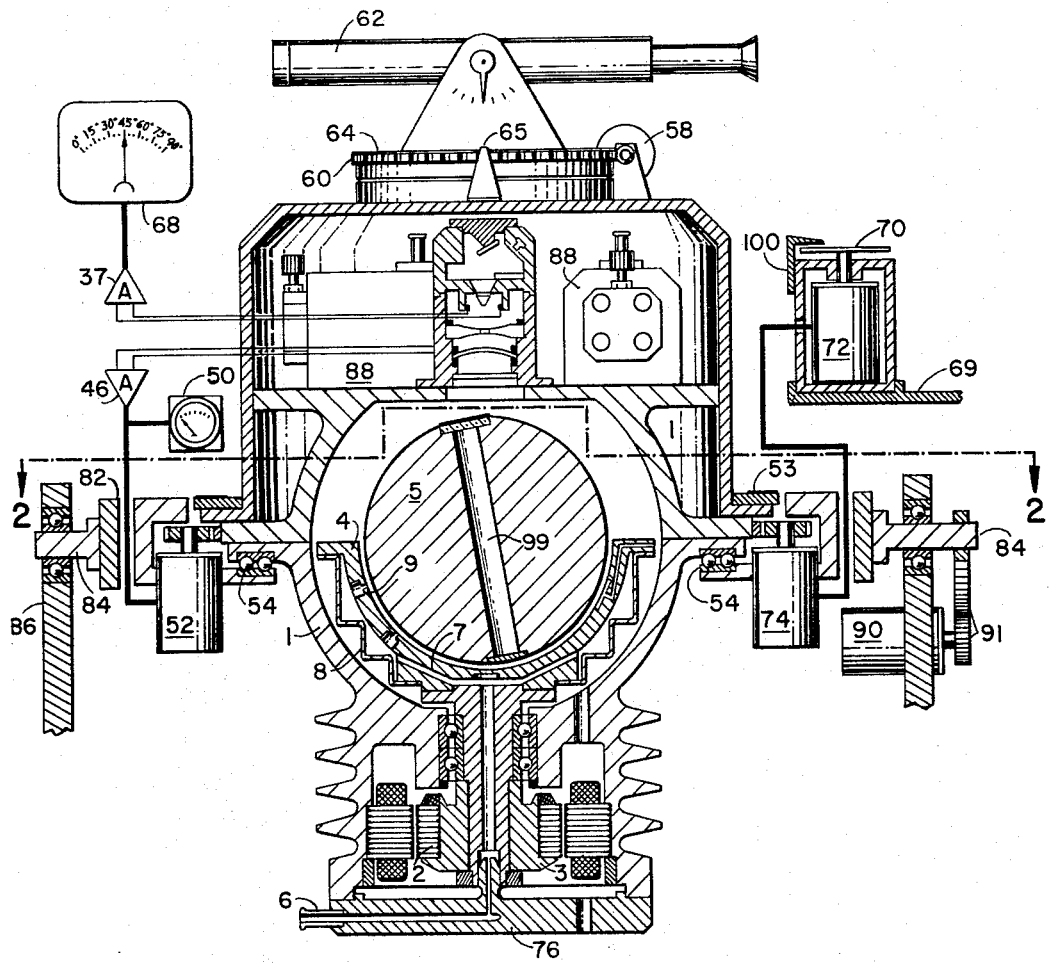
FIGURE 1 is an elevational view, mainly in section, of the measuring and indicating device.

With reference to the drawings, one element of the invention is a spherical gyroscope, shown as having a housing or frame 1, a motor 2, a shaft 3, a rotary cup or shell 4 that is fixed to shaft 3, and ball or sphere 5 (having an axial bore 99) that is supported in shell 4 by a bearing film of air or other gas. This gas is supplied under pressure via fitting 6, passages 7, flexible metallic casing 8 and passages 9. Although the gaseous film provides a bearing for the ball that has almost no friction, its cohesion insures that, soon after starting the motor, the ball rotates at the speed of the motor shaft.

In the previously known use of such a gyroscope (mainly in laboratories) an electrical servo loop has corrected slight misalignment of the spin axis of the air-supported ball and the spin axis of the rotary spherical shell. The present inventors have discovered that if this loop is eliminated there is a continual angular difference between these spin axes of a small fraction of a degree, that this angle is always in the east-west vertical plane, and that the size of the angle varies directly with the degree of latitude of the earth. An explanation of these principles, which the present invention utilizes in structure that will indicate the meridian and latitude at any non-polar part of the earth, is given below.

*Principles on which the invention is based*

The rotary mass of a gas-bearing spherical gyroscope comprises two parts: one being the rotary part or shell of the motor, and the other being the ball or sphere which is supported free of the shell by means of the gaseous film. In beginning an analysis of the operation, on the earth's surface, of this gyroscopic ball, let use assume that the spin axis of the rotary shell and the spin axis of the ball are in coincidence.

Figure 5:
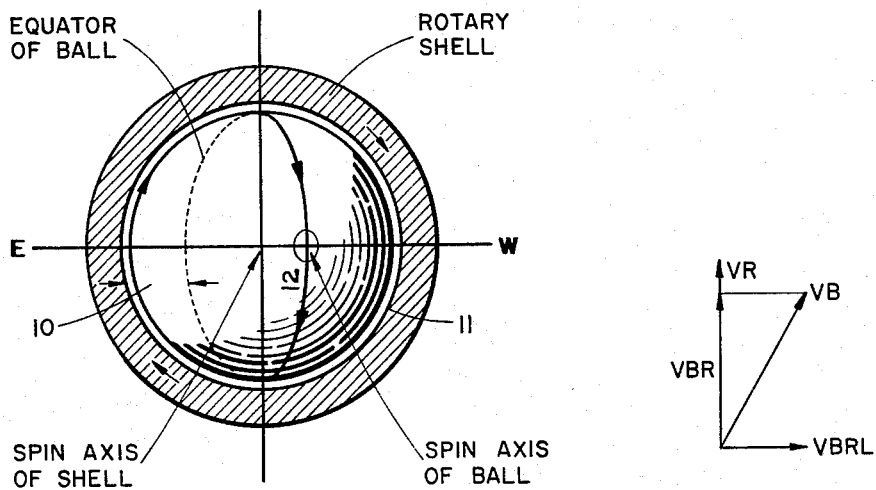
FIGURE 5 is a diagrammatic showing of the rotary parts and the torque from the rotating cup or shell.

At the next instant, due to the earth's rotation, the axis of the rotary shell has shifted so that an angle has developed between this axis and the space-fixed axis of the gyroscopic ball. This angle is equal to angle 10, indicated in FIGURE 5 as being between the horizontal equator 11 of the shell and the equator of the ball. After this shift, and as indicated in FIGURE 5, there is a horizontal-plane torque from the rotary shell which is exerted on the ball about the vertical spin axis of the shell. This torque may be resolved into two components. One of these is about the ball's spin axis, and in this analysis may be ignored since its effect is coincidental with the ball's spin. The second component, indicated at 12, is about an axis that is normal to the ball's spin axis. This second component is a precessing torque; it causes the gyroscopic ball to precess in the vertical east-west plane, and thus causes the ball's spin axis to follow the earth-shifted spin axis of the rotary shell. However, this precession of the ball never enables the spin axis of the ball to overtake and coincide with the spin axis of the casing. This is because in this event the component 12 would cease to exist and the ball's axis again would lag behind the spin axis.

Figure 4:
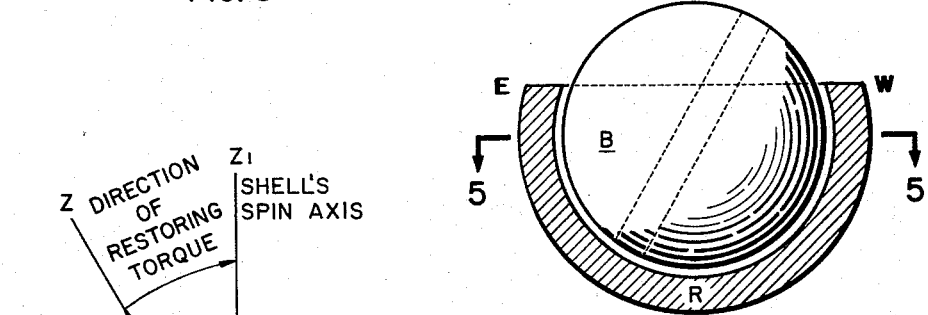
FIGURE 4 is a diagram of a velocity vector analysis pertaining to the gryoscope.

In the velocity vector analysis of the diagram of FIGURE 4: VB indicates the velocity of the spinning ball; VBR, the component of the ball's velocity in the axis of the rotary part of the motor; VBRL, the component of the ball's velocity at right angles to the axis of the rotary part of the motor; and VR, the velocity of the rotary part of the motor (of the rotary shell).

The amount of lag, for a given latatude, of the ball's spin axis behind the shell's spin axis is dependent on two factors. One of these, the earth-caused rate of rotation of the rotary shell's spin axis, varies from zero at either pole of the earth to a maximum at the earth's equator. At any specific latitude of the earth this factor is constant. The second factor is the viscous drag torque on the ball at right angles to its axis (from west to east). When the gyroscope begins to rotate, at a given latitude, this lag-caused angle of difference increases, and the precessing torque correspondingly increases, until the resulting rate of precession equals the rate of rotation of the shell's spin axis. If the torque from the motor-driven shell is maintained about a vertical axis, the angle of difference between the two spin axes is proportional to the earth's latitude. In the invention the shell's torque is thus maintained and the angle of difference is sensed and utilized for a relatively exact indication of the latitude.

In addition to the above result the invention provides an exact indication of the compass directions. This is due to the fact that the above mentioned angle is exactly in the east-west vertical plane.

The following three simplified equations indicate the above described operation:

$$C\dot{\phi}\dot{\theta} = -Wc\frac{8\pi R^4\mu}{3D}\sin\theta \quad (1)$$

$$C\dot{\phi}\dot{\psi}\sin\theta = 0 \quad (2)$$

$$C\ddot{\phi} = \frac{8\pi R^4\mu}{3D}(Wc\cos\theta - \dot{\theta}) \quad (3)$$

Figure 3:
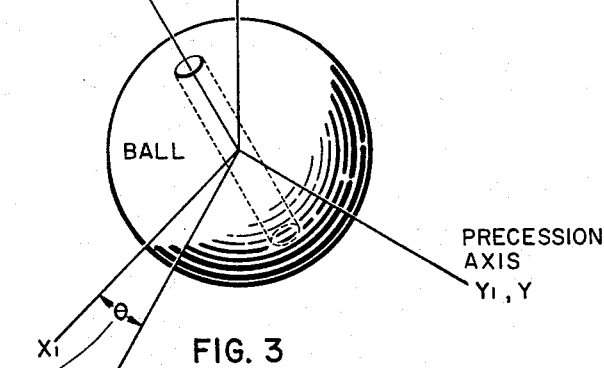
FIGURE 3 is a vectorial diagram showing the torque relationships within the gyroscopic part of the invention.

The symbols of these equations, one of which is diagrammatically shown in FIGURE 3, are:

$C$ = moment of inertia about the spin axis of the ball;
$\dot{\phi}$ = angular velocity about the spin axis of the ball;
$\dot{\theta}$ = angular rate of precession;
$R$ = radius of the ball;
$\mu$ = viscosity of the gas;
$D$ = air gap spacing;
$Wc$ = angular velocity of the rotary shell;
$\ddot{\phi}$ = acceleration (angular) about the spin axis of the ball;
$\theta$ = angle between the axes of the ball and shell;
$\dot{\psi}$ = angular rate of precession at 90 degrees to $\phi$ and $\theta$.

The time of the stabilized response to the earth's rate of rotation (due to achieving equilibrium in the rates of rotation of the two spin axes) may be ascertained by mans of the following equation:

$$\theta_0 = \frac{3DC}{8\pi R^4\mu}We\cos\lambda\left[1 - e^{\left(-\frac{8\pi R^4\mu}{3DC}\right)}\right] \quad (4)$$

In his quation:

$\theta_0$ = angle between the axes of the ball and shell, as a time function, in the east-west plane;
$t$ = time;
$D$ = the air gap distance;
$C$ = the moment of inertia about the spin axis;
$R$ = the radius of the ball;
$\mu$ = the viscosity of the gas;
$We$ = the angular velocity of the earth;
$\lambda$ = the latitude angle.

For clarity, the showing in FIGURE 1 of the lag of the ball's spin axis behind that of the rotating shell or cup 4 is exaggerated. In the normal operation of an instrument of the invention in which the shell is spherical, this lag is very small, being a fraction of a degree. Although such a spherical shell may be used in combination with the other elements of this invention to indicate the meridian and latitude, in the preferred form of the invention the rotating cup or shell 4, as shown, is only enough larger than a hemisphere to hold the ball from falling from the cup in transport. This limitation of the spherical bearing surface area decreases the drag in the air film and thus provides a larger angle between the spin axes, and a finer indication of the differences between two latitudes that are close together.

A caging device, not shown, is preferably utilized to hold the ball and shell against relative rotation when the motor is started.

Figure 6:
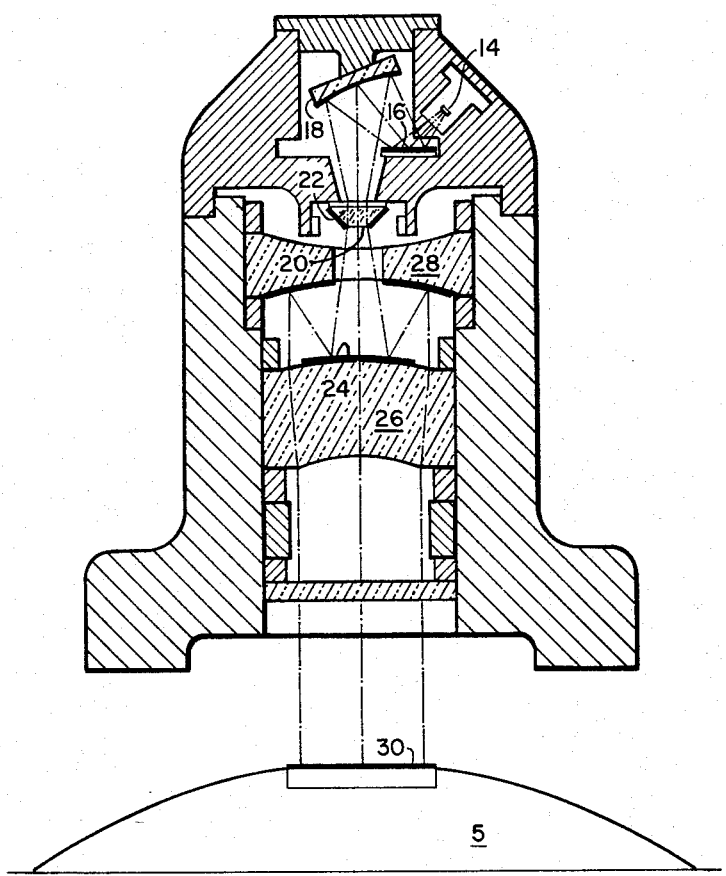
FIGURE 6 is an enlarged detail view in section of the optical sensor.

An efficient means for sensing change in the angle between the spin axes is a necessary element of the invention. Any device of this type that is sufficiently sensitive to indicate very small changes of angle may be used. But preferably the optical sensor shown in FIGURE 6 is utilized. This two-axis, null-sensing autocollimator comprises a microlamp 14, a pair of mirror-surfaced lenses 16 and 18 which reflect light, thru the unsilvered nose portion 20 of prism 22 (which is in the form of a truncated pyramid), on mirrored surface 24 of corrector lens 26. Thence the light is reflected to the lower, mirrored surface of apertured lens 28, and from there thru corrector lens 26. From this lens the collimated light then goes to mirror 30 on apertured ball 5, from which it is reflected back via the lower lenses to prism 22.

FIGURE 6 indicates the functioning of the optical sensor when the instrument is at one of the poles of the earth and there is no earth-induced lag in the position of the ball's spin axis relative to the shell's spin axis. All the light is reflected back thru the clear-glass nose 20 of prism 22, and none strikes any of the four mirrored sides of the truncated pyramid of the prism.

Figure 7A:
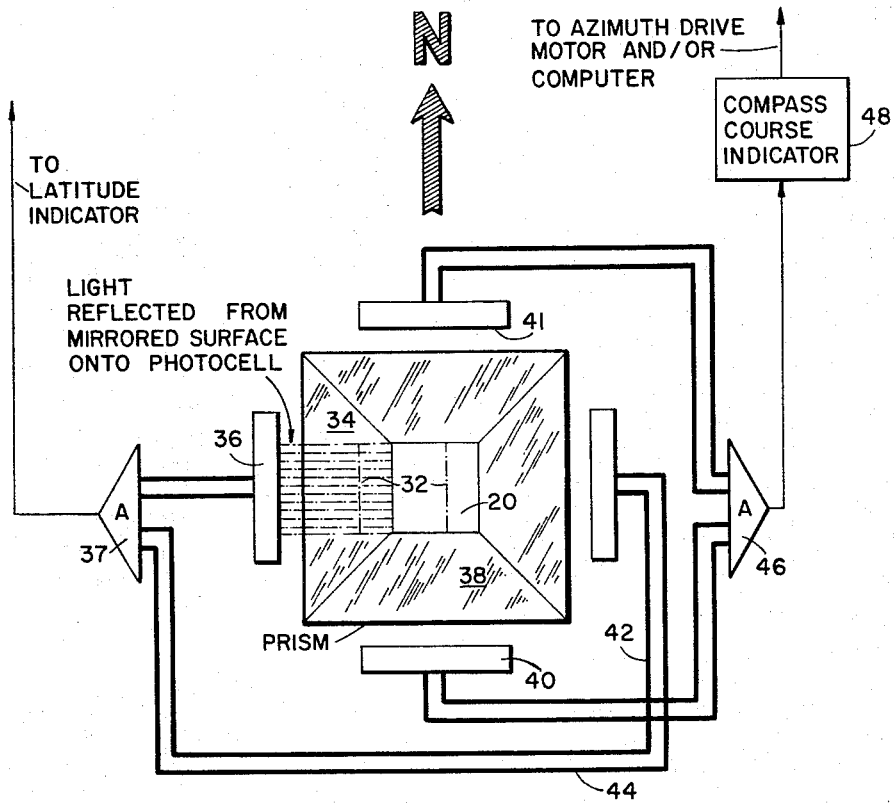
FIGURE 7 (comprising sub-FIGURES A and B) is a schematic showing of the operation of the position-sensing assembly.

At any other position on the earth's surface the sensor provides signals that indicate the latitude and the north-south direction. This functioning is illustrated in sub-FIGURES A and B of FIGURE 7, in each of which the schematic view is upward from the mirror on the gyroscopic ball. In sub-FIGURE 7A the returning beam 32 is shown as striking partly on the unmirrored nose 20 of the prism and partly on mirrored surface 34, which comprises one of the four bottom sides of the truncated pyramid. The amount of light that strikes this mirrored surface is a measure of the angle of difference between the spin axes of the gyroscopic ball and the rotary shell; and this angle is proportional to the latitude. This quantity of light, as shown, is reflected on photocell 36, which supplies a signal current, via amplifier 37, that is a measure of the latitude.

Figure 7B:
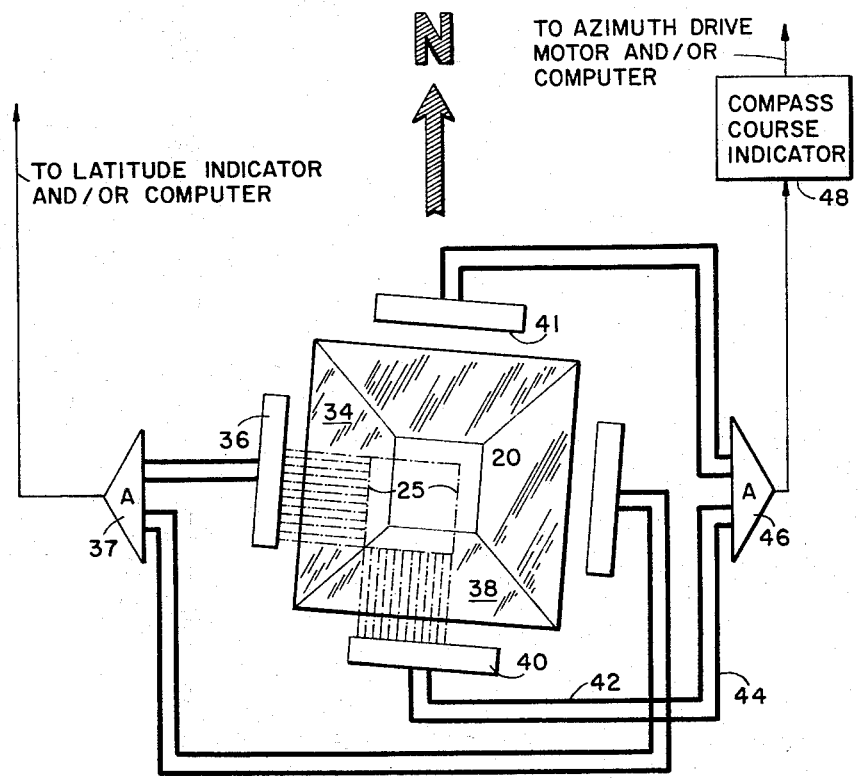

In sub-FIGURE 7B the reflected light beam 25 is shown as striking partly on the unmirrored nose 20 and partly on two mirrored surfaces, 34 and 38. As in the situation of sub-FIGURE 7A, the amount of light that is reflected from mirror 34 on to photocell 36 leads to a signal that is a measure of the latitude. But now some light is also striking mirror 38, due to the rotation in azimuth of support 1 relative to the spin axis of the ball; and the amount of this light is proportional to the angular deviation of housing 1 from its position that indicates the north-south line (or, alternatively, any desired compass direction). Therefore, the quantity of light that is reflected by mirror 38 on photocell 40, and the resulting signal current supplied by electrical connections 42 and 44 to amplifier 46 are also proportional to the azimuthal rotation of housing 1 from its desired position. If the instrument is used on a vehicle—for example, on a ship, airplane, missile or land vehicle on a desert—and its housing is fixed in azimuth relative to the vehicle but is maintained in a level position (that is, with the spin axis of rotary cup 4 vertical), the signal from amplifier 46 may be conducted to compass course indicator 48, which may be in the form of a voltmeter pointer and compass card, and may be utilized by a helmsman in steering the vehicle on a desired course. Also, as indicated, the signal current may be conducted to a computer, the output of which may be utilized in an automatic pilot.

Figure 2:
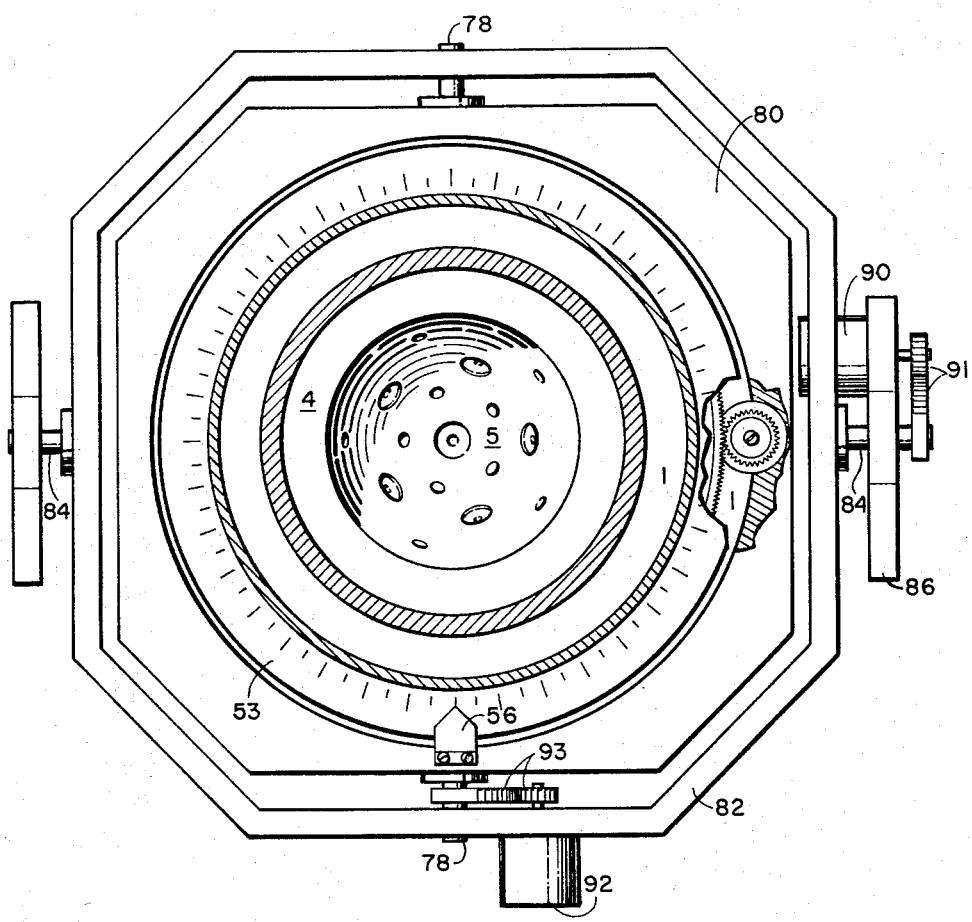
FIGURE 2 is a sectional view from the plane 2—2 of FIGURE 1.

Another example of the use of the instrument is shown in FIGURES 1 and 2. In this currently preferred form of the invention the compass course indicator is still actuated in response to the signals from amplifier 46 but is not electrically connected to the amplifier, and the housing of the instrument is automatically maintained in a predetermined azimuthal position.

With reference to FIGURE 1, the signal is conducted from amplifier 46, via voltmeter 50, to reversible servo motor 52. This motor operates in the proper direction, determined by the voltage polarity, which depends on the particular one of photocells 40 and 41 that is supplying a signal via the amplifier bridge circuit.

The motor thus rotates housing 1 (and attached compass card 53 on bearings 54) until the north-south line of the housing and sensor is properly oriented relative to the vertical east-west plane thru the inclined spin axis of the ball. Voltmeter 50 indicates when this proper orientation is achieved. If the voltmeter indicates zero, any predetermined datum line on the housing—preferably, the north-south graduation on compass card 53—is in its proper position. On this card the graduation indicated by pointer 56 (FIGURE 2) is its compass bearing. If the instrument is on a vehicle this pointer is in the fore-and-aft line of the vehicle and indicates its compass course.

As indicated in FIGURE 1, a repeater compass also may be placed at a distance from housing 1. Compass card 70 is rotated in synchronism with card 53 by synchronous motor 72, which receives current from synchronous transmitter 74. Transmitter 74 is geared to housing 1.

The signal current from amplifier 37 is conducted to latitude indicator 68, which, as shown, may be remotely located, comprising a voltmeter and a scale of latitude indicia.

A theodolite is mounted on housing 1. It comprises handwheel 58 and gearing 60, by which telescope 62 may be rotated in azimuth until a desired sighting of an object is obtained. Since pointer 65 is automatically maintained in a north-south direction, the graduation of compass card 64 that is indicated by the pointer is the compass bearing of the object. If the instrument is on a vehicle, the object's bearing relative to the vehicle is the algebraic sum of the theodolite reading and the compass course reading that is indicated by pointer 56 (or pointer 100).

The device that has been described above would be accurate if the bottom plane of its base 76, which, as shown, is normal to the spin axis of rotary cup 4, were placed on a predetermned level support on the land. But, for use on a vehicle, this preferred form of the invention comprises automatic leveling means. A pair of trunnions, indicated at 78 in FIGURE 2, project from element 80, which supports bearings 54 and housing 1, allowing the housing and motor 2 to pivot within gimbal ring or frame 82; and trunnions 84 (FIGURE 1) provide for pivotal movement of this ring on supports 86. Thus there is achieved a pendulous support of the housing, motor, rotary cup and ball, due to the fact that the center of gravity of these elements is considerably lower than their pivotal supports. This pendulous suspension efficiently provides for a level position of base 72 when supports 86 are not frequently tilted. But when they are subject to frequent swaying, as on a boat or ship, shock absorbers of any appropriate known type may be used. Preferably, however, and as shown in FIGURES 1 and 2, level-indicating devices 88, of the type described in Patent 2,958,137 to F. K. Mueller, are utilized. Each of the indicators 88 supplies an electric signal when the housing and sensor are out of their proper position relative to the horizon and to the axis of one of the pairs of trunnions; and these signals are transmitted via conductors and amplifiers to motors 90 and 92. Motor 90 pivots the outer gimbal ring 82 by means of gearing 91; and motor 92, which is supported on ring 82, pivots inner gimbal frame 80 by means of gearing 93. Thus the instrument is stably maintained in a level position, in which the spin axis of the motor and cup is vertical. This stable maintenance is obtained due to the inherent inertia of the leveling motors and the friction of gearing 91 and 93 between these motors and the housing. Thus the means for maintaining in a vertical position the axis of the rotary, gyroscope-spinning cup also prevents jostling vibration of the instrument by the frequent swaying of any boat, ship or other craft on which the device is located.

When used in the automatic control of missiles or space-craft, designed for substantially or nearly horizontal flying close to the earth's surface, the latitude indicator, compass cards and theodolite may be eliminated.

*Operation*

With the instrument maintained in a level position, and the gaseous bearing film causing the ball to float within rotary cup 4 and to spin with the cup, the rotation of the earth, as explained above, causes the spin axis of the ball (at the center of bore 99) to be slightly inclined relative to the spin axis of the cup. This inclination is in the east-west direction and is measured by the position-sensing assembly. The resulting signal provides an indication of the latitude in indicator 68. The sensor also detects any azimuthal movement of housing 1 out of its proper position relative to the east-west direction (and to the bore 99). There is thus provided a second signal, which is indicated by voltmeter 50, and causes operation of the motor 52 to bring the housing, compass card 53 and pointer 65 back into their proper azimuthal position. The pointer 56, which points in the fore-and-aft line of the vehicle, thus indicates on compass card 53 the direction in which the vehicle is oriented. Also and optionally, the direction of the vehicle's course may be indicated by pointer 100 of the repeater compass. The bearing of any object visible thru telescope 62 may be quickly obtained from the graduation on card 64 that is indicated by pointer 65.

Figure 8:
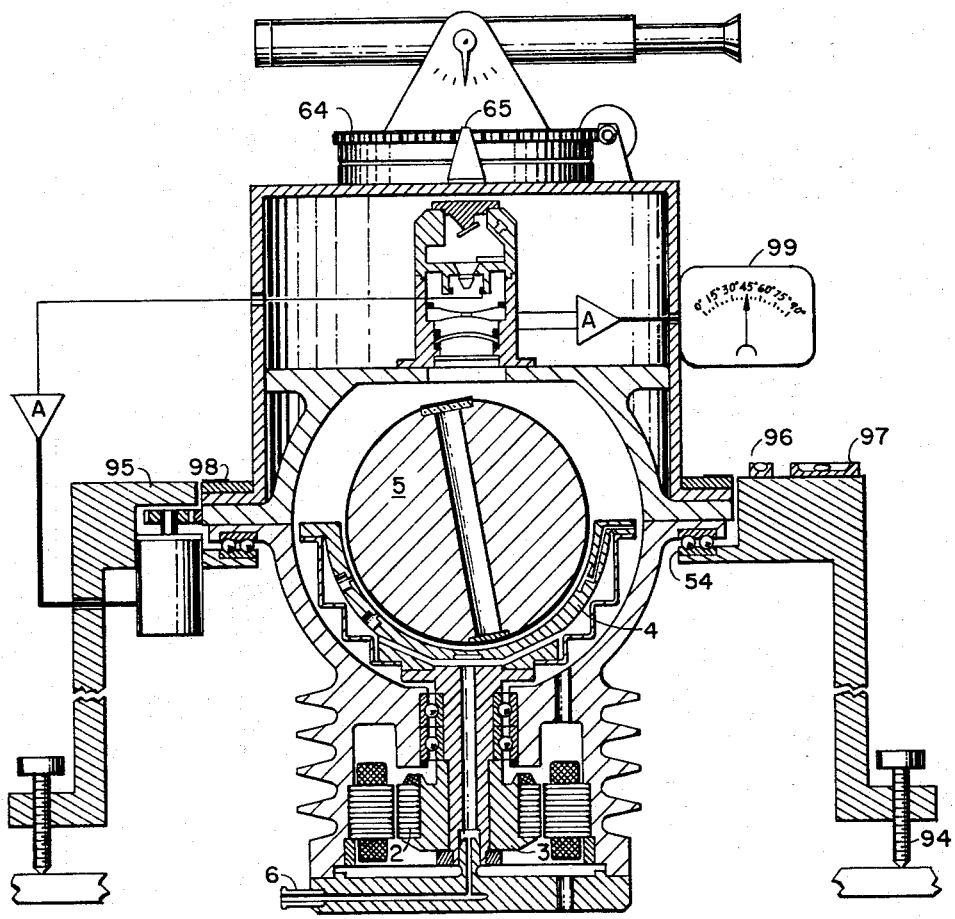
FIGURE 8 is an elevational view, mainly in section, of a second form of the instrument.

In FIGURE 8 there is shown a simplified embodiment of the invention, designed for use on a stable support on the land. In this form the leveling means is not automatic. It comprises four screws, 94, which may be adjusted until shoulder 95 is level. Optionally, two small levels, 96 and 97, may be fixed at right angles to each other on shoulder 95. A compass card, 98, its associated pointer (fixed to shoulder 95, not shown in the sectional view of FIGURE 8, but similar to pointer 56 of FIGURE 2), theodolite compass card 64 and pointer 65 are utilized; and latitude indicator 99 optionally may be supported by the upper part of the instrument housing.

The invention comprehends various changes in structure from that herein illustrated, within the scope of the subjoined claims.

The following invention is claimed:

1. A direction-indicating gyroscopic instrument comprising:
   a support;
   a rotary frame on said support, rotatably mounted about a vertical axis, and having passage means for conducting pressurized gas to one of its surfaces and a direction-indicating datum means;
   means for maintaining the rotary axis of said frame in a vertical position and preventing jostling of the frame when said support is shaken comprising a pair of orthogonally arranged horizontal-axis bearings, providing for pivoting of the frame on said support about perpendicular axes, a motor at each of said bearings, gearing drivably connecting said motor to the frame for turning it on one of said bearings, and level-sensitive means for controlling said motors;
   a cupshaped rotary element, having an upper concave surface, mounted on said frame for rotation about said vertical axis, having a plurality of balancedly spaced holes debouching on said concave surfaces and means for conducting pressurized gas from said passage means to said holes, whereby a gaseous bearing film is provided on the concave surface;
   a motor balancedly mounted on said frame below said concave surface;

power-transmission means between said motor and rotary element:

a single, balanced, substantially spherical, gyroscopic rotor freely mounted on said gaseous film and concave surface, rotated by said film at the speed of said motor after it has run a while, having an axis that continually lags relatively to said vertical axis and forms an angle with this axis in the east-west vertical plane that changes with changing latitude and in all locations other than one of the earth's poles is proportional to the latitude of the instrument;

radiant energy reflecting means on said rotor;

means on said frame for directing a beam of radiant energy to said reflecting means and receiving from it reflected energy;

motive means, controlled by said reflected energy, connected to said support and to said frame, for rotating the frame about said vertical axis and thus returning said datum means to its direction-indicating position when said support and frame have been rotated relatively to the east-west vertical plane.

2. A latitude and direction indicating device comprising:

a support;

a rotary member mounted on said support for rotation about a vertical axis, having passage means for conducting pressurized gas to one of its surfaces;

means for maintaining the rotary axis of said member in a vertical position comprising a pair of orthogonally arranged, horizontal-axis bearings, means for pivoting the member on said bearings including means for preventing jostling vibration of said member relatively to said support;

a rotary element, having an upper concave surface, mounted on said member for rotation about said vertical axis;

a balanced gyroscopic member, having a spherical surface juxtaposed to and mating with said concave surface;

means for supplying pressurized gas through said rotary member and element and to said gyroscopic member to form a bearing film between said element and gyroscopic member, said gas being free to escape from said film upwardly around said gyroscopic member and having slight but sufficient friction to drive said gyroscopic member from said rotary element;

said gyroscopic member having a rotary axis that continually lags relatively to said vertical axis and forms an angle with this axis in the east-west vertical plane that changes with changing latitude and in all nonpolar locations is proportional to the latitude of the instrument;

radiant energy reflecting means on said gyroscopic member;

means on said rotary member for directing a beam of radiant energy to said reflecting means and receiving from it reflected energy;

motive means, connected to said support and to said rotary member, influenced by said reflected energy when said support and rotary member have been rotated relative to the east-west vertical plane, for rotating said rotary member and returning it to a predetermined position relative to the east-west vertical plane;

means, moved in synchronism with said rotary member, for indicating direction; and calibrated means, controlled by a portion of said reflected energy that is proportional to the size of said angle of lag, for indicating the latitude of the instrument's location.

3. A device as set forth in claim 2, in which said means for maintaining vertical the axis of rotation of said rotary element comprises level-sensing means, mounted on said housing and supplying signals of deviations of said element's axis from the vertical, and powered means, connected to said level-sensing means and influenced by said signals, for tilting said housing on its universal mounting and restoring said axis to its vertical position, said means for preventing jostling vibration comprising gearing between said powered means and housing.

4. A measuring and indicating device comprising:

a support;

a housing;

means universally mounting said housing on said support;

a motor fixed to said housing;

a rotary element connected to and rotatable by said motor, having a spherical surface, a gyroscopic member, having a spherical surface juxtaposed to and mating with said first-named spherical surface;

means providing between said surfaces a gaseous bearing film, having sufficient friction to drive said gyroscopic member from said rotary element;

means for maintaining vertical the axis of rotation of said rotary element;

a position-sensing assembly carried by said housing, comprising means for sensing the latitude-measuring angle that, in any nonpolar location, exists between the spin axis of said rotary element and gyroscopic member, which changes in size as the latitude of the device changes, and supplying a signal of a value that is proportional to the size of said angle, said assembly comprising: a reflector on said gyroscopic member; a source of radiant energy mounted on said housing, for projecting a beam toward said member; a set of beam-reflecting lenses mounted on said housing between said energy source and member for widening said beam and indicating the direction of its reflection from said reflector; and a plurality of photocells, one of which is in the path of the beam reflected substantially along said east-west plane, and another of which comes into the path of the beam reflected at right angles to said first-named path when said housing rotates in azimuth relative to said east-west plane, said photocells supplying separate signals of latitude and of azimuthal rotation of said housing relative to the east-west plane of said member's spin axis.

5. A device as set forth in claim 4, which further comprises a motive means, connected to said sensing means and influenced by said second signal, for rotating said housing back into its predetermined azimuthal position.

6. A measuring and indicating device comprising:

a support;

a housing;

means universally mounting said housing on said support;

a motor carried by said housing;

a vertical-axis rotary element connected to and rotatable by said motor, said element having an internal spherical surface, forming a cavity;

a single, spherical gyroscopic rotor, having an axially-located hollow space, mounted within said cavity;

means providing a gaseous bearing for said member in said cavity;

a position-sensing assembly mounted on said housing, comprising radiant-energy-utilizing means for sensing and signalling the size of the angle that, in any non-polar location, exists between the spin axis of said element and the spin axis of said gyroscopic rotor, said angle varying in size as the latitude changes, said assembly thus supplying a latitude-indicating signal; and indicator means, comprising a movable element, connected to said position-sensing assembly and influenced by said signal, calibrated to indicate the latitude of said location.

7. A device as set forth in claim 6, in which said motor is electrical and said signal is an electric current.

8. A device as set forth in claim 6, in which said means for maintaining vertical the axis of rotation of said motor and rotary element comprises level-sensing means, fixed to said housing, and supplying signals of deviations of said element's axis from the vertical, and powered means, connected to said level-sensing means and receiving said signals, for tilting said housing on its universal mounting and restoring said element's axis to its vertical position.

9. An indicating device comprising:
a support;
a housing;
means universally mounting said housing on said support, comprising orthogonally arranged pivot bearings;
a motor supported by said housing;
a rotary element connected to and rotatable by said motor, having an internal, spherical, rotary surface, forming an upwardly open cavity;
a single gyroscopic rotor, having an outer, spherical surface freely fitting within said internal rotary surfaces;
means providing a gaseous bearing for said rotor on said internal rotary surface, said bearing having an amount of friction that provides a drive for said rotor from said internal rotary surface, permits the earth's rotation to form a small lag angle between the axes of the rotor and of said rotary element, and permits said angle to vary as the latitude changes;
means providing for a vertical position of the axis of said motor and rotary element, comprising motive means and connections between the motive means and said support and the motive means and said housing, the inertia and friction of said motive means and connections preventing free swaying of the housing on said pivot bearings;
a position-sensing assembly, comprising means for directing radiant energy to and from said rotor, for sensing azimuthal rotation of said housing relative to the vertical east-west plane thru the slightly inclined spin axis of said gyroscopic rotor and supplying a signal of said rotation; and
motive means, connected to said support and to said housing, influenced by said signal, for rotating said housing, after it has turned relatively to the vertical east-west plane, back to its predetermined position relative to said plane.

10. A device as set forth in claim 9, in which said motor, signal and motive means are electrical.

11. A device as set forth in claim 9, which further comprises a theodolite supported by said housing, comprising: a sighting device; means for rotating said device for obtaining a line of sight on an object; and indicating means, comprising two parts, for indicating the compass bearing of said line of sight, one of said parts being attached to said housing, and the other of said parts being connected and rotatable with said sighting device.

12. An indicating device comprising:
a support;
a housing;
means universally mounting said housing on said support;
a motor supported by said housing;
a rotary element connected to and rotatable by said motor, having an internal spherical surface forming a cavity;
a gyroscopic member, having an outer spherical surface and an internal hollow space, mounted within said cavity;
means providing an antifriction bearing for said member in said internal spherical surface, said bearing having an amount of friction that provides a drive for said gyroscopic member from said internal surface and permits the earth's rotation to form a small lag angle between the axes of the gyroscopic member and rotary element, and permits said angle to vary with latitude change;
means providing for a vertical position of the axis of rotation of said motor and rotary element and of the plane of said lag angle;
a position-sensing assembly for sensing azimuthal rotation of said housing relatively to the east-west plane thru the slightly inclined spin axis of said gyroscopic member and supplying a signal of said rotation, comprising: a mirror on said gyroscopic member; a light source providing a beam of light; lenses mounted on said housing between said source and member, in the path of said beam, constructed and arranged to increase the cross-sectional area of the beam and direct it on said mirror; a mirrored inclined surface mounted on said housing substantially perpendicularly to the north-south plane thru the spin axis of said rotary element when said housing is properly oriented relatively to said plane; and a photocell mounted on said housing in the path of the light reflected from said inclined surface, said photocell thus supplying a signal of azimuthal rotation of said housing relative to said north-south plane; and
motive means, connected to said sensing means and influenced by said signal, to rotate said housing back to its predetermined position in azimuth relative to said inclined spin axis.

13. A device as set forth in claim 12, in which said means for providing an antifriction bearing comprises means for supplying gas under pressure to the space between said member and internal spherical surface, thus providing a gaseous bearing for said member.

14. A device as set forth in claim 13, in which said means for maintaining vertical the axis of rotation of said motor and rotary element comprises level-sensing means, mounted on said housing, constructed and arranged to supply signals of deviations of said element's axis from the vertical, and powered means, connected to said level-sensing means and influenced by said signals, for tilting said housing on its universal mounting and thus restoring said axis to its vertical position.

15. A direction and latitude indicating instrument comprising:
a housing, having a direction-indicating line;
a motor on said housing;
a rotary element, journalled on a vertical axis, connected to and rotatable by said motor, and having a spherical surface;
a single gyroscopic rotor, freely mounted relatively to said element and having a spherical surface, said spherical surfaces having mating contours, said rotor having a spin axis that is inclined to said vertical axis in the vertical east-west plane;
means providing a gaseous bearing between said spherical surfaces;
sensing means attached to said housing, comprising elements for sensing azimuthal rotation of the housing and its direction-indicating line relative to said inclined spin axis and supplying a signal of said rotation, the signal ceasing on rotation of the housing back to its predetermined position relative to said vertical plane, and further comprising other elements for sensing the size of the earth-rotation-caused angle between said inclined spin axis and said vertical axis, which angle varies with the latitude, and supplying a latitude-indicating signal of said size; and
means, influenced by said last-named signal, for indicating the latitude of said instrument.

16. An indicating device comprising:
a support;
a motor on said support;
means for maintaining the axis of said motor in a predetermined position;

a cup, connected to and rotatable by said motor, having an internal spherical surface;

a spherical-surfaced gyroscopic rotor freely mounted within said cup, said rotor having a centrally located hollow space and a spin axis that is inclined to the motor axis in the east-west plane;

means providing a gaseous bearing for said rotor in said cup;

a sensor, attached to said housing, for sensing the size of the angle of inclination of said rotor's spin axis, which size varies with a change in the latitude of the device's location, to various values at various locations and supplying a signal of said size; and means, influenced by said signal, comprising a latitude scale and an element movable in response to said signal, for indicating said latitude.

17. An apparatus for measuring and indicating the latitude of an object or place comprising:

a support;

a gyroscope, supported by said support, which includes a rotary element having a rotating spherical surface, motive means to spin said element about a vertical axis of rotation, a rotor having a rotating spherical surface freely mounted to turn relatively to said element, said spherical surfaces having mating contours, a gaseous bearing between said rotating spherical surfaces;

sensing means sensitive to and indicating the size of the east-west angle of precession between the axis of rotation of the rotary element and the axis of rotation of the rotor, said angle freely changing with changing latitude and varying as a function of the latitude of the gyroscopic;

means for maintaining vertical said axis of rotation of the motive means, comprising connections between said support and gyroscope which prevent swaying of said motive means and sensing means relative to said support.

18. A measuring and indicating device comprising:

a support;

a housing;

means universally mounting said housing on said support;

a motor fixed to said housing;

a rotary element connected to and rotatable by said motor, having an internal spherical surface, forming a cavity;

a ball-like gyroscopic member, having an axially-located hollow space, mounted within said cavity;

means providing an antifriction bearing for said member in said cavity comprising means for supplying gas under pressure to the space between said member and said internal, spherical surface, thus providing a gaseous bearing for said member;

means for maintaining vertical the axis of rotation of said rotary element;

a position-sensing assembly carried by said housing, comprising a mirror on said gyroscopic member, a source of light mounted on said housing for projecting a beam toward said member, a set of mirrored lenses mounted on said housing between said light source and member for widening said beam and for indicating the direction of its reflection from said mirror, two pairs of photocells, diametrically and orthogonally arranged relative to the axis of rotation of said rotary element, one of said photocells being in the path of the light reflected substantially along the plane of the angle between the axes of the rotary element and gyroscopic member which exists in non-polar locations and which varies with change in latitude, and another of said photocells coming into the path of the light reflected at right angles to said first-named path when said housing rotates in azimuth relative to said plane, the photocells thus supplying signals of latitude and to azimuthal rotation of said housing relative to said plane;

indicator means, connected to one pair of said photocells and influenced by said latitude signal, to indicate the latitude of the location of the device; and motive means, connected to the other pair of said photocells and influenced by said signal of azimuthal rotation, for rotating said housing in azimuth back into its predetermined azimuthal position relative to said plane.

19. A device for indicating direction comprising:

a gyroscope which includes a support having a direction-indicating mark, means connected with said support, comprising level-sensing means on the support, for maintaining it in a predetermined position relative to a predetermined line, a cup-like rotary element having an interal rotating spherical surface and a plurality of holes debouching on said internal spherical surface, equally spaced around circles centered on said line, means on said support for spinning said element about an axis which coincides with said line, a dynamically balanced rotor having an external rotating spherical surface freely mounted on said internal surface and free to tilt relatively to said element due to the earth's rotation, the rotor's axis thus forming a small angle with said line that is free to change in size with a change in latitude of the device, an antifriction bearing comprising a gaseous film between said spherical surfaces, means for supplying gas thru said holes, thus providing a balanced supply of bearing gas into said film, said gas being free to escape from said film alongside said rotor and a motor for driving said rotary element, said rotor being located at a sufficient distance from said motor to be substantially free from electromagnetic torque from the motor;

position-sensing means for sensing azimuthal rotation of said support from its predetermined position relative to the plane of said angle, comprising means on said support for transmitting a beam of radiant energy along said vertical line and axis, and means athwart said axis and on said rotor for reflecting said beam; and means, influenced by said position-sensing means, to turn said support back to said predetermined position.

References Cited by the Examiner

UNITED STATES PATENTS

| | | | |
|---|---|---|---|
| 1,890,831 | 12/1932 | Smyth | 33—226 |
| 1,924,037 | 8/1933 | Henderson | 33—204 |
| 1,998,948 | 4/1935 | Wittkuhns et al. | 33—226 |
| 2,044,899 | 6/1936 | Carter | 33—226 |
| 2,790,119 | 4/1957 | Konet et al. | 33—206 X |
| 2,926,530 | 3/1960 | Mueller et al. | 33—206 X |
| 2,958,137 | 11/1960 | Mueller | 33—206 |

FOREIGN PATENTS

| | | |
|---|---|---|
| 1,251,996 | 12/1960 | France. |
| 784,693 | 10/1957 | Great Britain. |
| 886,063 | 1/1962 | Great Britain. |

ROBERT B. HULL, *Primary Examiner.*

ISAAC LISANN, *Examiner.*